(12) United States Patent
Ganz

(10) Patent No.: US 6,476,315 B2
(45) Date of Patent: Nov. 5, 2002

(54) SOLAR SYSTEM FOR A MOTOR VEHICLE

(75) Inventor: Thomas Ganz, Stockdorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/837,874

(22) Filed: Apr. 19, 2001

(65) Prior Publication Data

US 2002/0000243 A1 Jan. 3, 2002

(30) Foreign Application Priority Data

Apr. 20, 2000 (DE) .......................... 100 19 889

(51) Int. Cl.[7] .......................... H01L 31/042; H02J 7/35; H02N 6/00
(52) U.S. Cl. .................. 136/293; 136/291; 136/244; 388/903; 388/935; 318/480; 320/101; 323/221; 323/234; 323/906; 454/900; 454/75
(58) Field of Search ............................. 136/293, 291, 136/244; 388/903, 935; 318/480; 320/101; 323/221, 234, 906; 454/900, 75

(56) References Cited

U.S. PATENT DOCUMENTS 5,479,557 A * 12/1995 Ganz et al. ............... 388/829
5,779,817 A 7/1998 Wecker
6,290,593 B1 * 9/2001 Weissbrich et al. ........... 454/75
2002/0000785 A1 * 1/2002 Ganz .......................... 320/101

FOREIGN PATENT DOCUMENTS

| DE | 36 10 767 A1 | 10/1987 |
| DE | 198 39 711 C1 | 4/2000 |
| EP | 0 861 746 A2 | 9/1998 |
| GB | 2057756 * | 4/1981 |

OTHER PUBLICATIONS

Derwent abstract No. 1997–551402, Nov. 1997.*

* cited by examiner

*Primary Examiner*—Alan Diamond
(74) *Attorney, Agent, or Firm*—Nixon Peabody LLP; David S. Safran

(57) ABSTRACT

A solar system for a motor vehicle, which is provided with a solar generator and a DC/DC converter unit, the solar system being switchable for supplying a power consuming device in the motor vehicle or for recharging of the motor vehicle battery. The DC/DC converter unit is made with two poles on the output side and functionally comprises a first and a second DC/DC converter which are respectively optimized with respect to the supply function of the power consuming device and the recharging function, there being a changeover unit which acquires the voltage at the output of the DC/DC converter unit and switches the output depending on the acquired voltage to either the first DC/DC converter or the second DC/DC converter.

12 Claims, 3 Drawing Sheets

SOLAR SYSTEM FOR A MOTOR VEHICLE

BACKGROUND OF THE INVENTION

1. Field of the Invention

This invention relates to a solar system for a motor vehicle with a motor vehicle roof and a motor vehicle interior, especially a solar cover, the solar system has a solar generator and a DC/DC converter unit, where the solar system switchably supplies a power consuming device in the motor vehicle and recharges a motor vehicle battery in the motor vehicle.

2. Description of Related Art

German Patent DE 198 39 711 discloses a solar system in which the DC/DC converter has two different outputs which lead to a fan motor or the motor vehicle battery, the DC/DC converter being provided with a battery charging function which results in that a fixed basic amount of electric power generated by the solar generator is supplied to the motor vehicle battery and the amount of electric power generated by the solar generator which exceeds this basic amount is supplied to the fan motor. It is not further explained how impedance matching to two power consuming devices with different impedance, i.e. the motor vehicle battery and the fan motor, is to take place.

Published European Patent Application EP 0 861 746 A1 corresponding U.S. patent application Ser. No. 09/031,062 discloses a similar solar system in which switching between the supply of the motor vehicle battery and of the fan motor takes place automatically, and the automatic switching can be overridden by a manually activated switch. Here too, there are separate outputs for the motor vehicle battery and the fan motor. There are no details here with regard to impedance matching.

Published German Patent Application DE 36 10 767 A1 discloses a solar system for a motor vehicle in which the solar generator comprises at least two solar cell units which are series connected by means of a changeover switch for battery recharging and which can be connected in parallel for supply of a fan blower. There is no impedance converter.

German Patent DE 195 27 740 C1 corresponding U.S. Pat. No. 5,779,817 discloses impedance matching in a solar system for a motor vehicle by selective parallel connection or series connection of strings of solar cells in order to selectively operate a fan motor or recharge a vehicle battery.

SUMMARY OF THE INVENTION

The object of this invention is to devise a solar system for a motor vehicle which in as simple a manner as possible with as few terminal contacts as possible allows impedance-matched supply both of a power consuming device in the motor vehicle and also the motor vehicle battery.

This object is achieved by a solar system for a motor vehicle with a motor vehicle roof and a motor vehicle interior, where the solar system has a solar generator, and a DC/DC converter unit, where the solar system switchably supplies a power consuming device in the motor vehicle and recharges a motor vehicle battery in the motor vehicle, where the DC/DC converter unit comprises a first and a second DC/DC converter, the DC/DC converter unit is optimized with respect to the supply function of the power consuming device and the recharging function of the vehicle battery, and where a changeover unit acquires a voltage at an output of the DC/DC converter unit and the changeover unit switches the output depending on the acquired voltage to the first and the second DC/DC converter. In this approach, it is advantageous that the impedance converter unit has only one output and still enables optimized impedance matching both for supply of the power consuming device and also the battery. In this way, the number of required electrical contacts can be minimized and by integration of the two impedance converters into a single unit, money and installation space can be saved. Furthermore, incorporation into the motor vehicle can be made very flexible since almost no additional components are necessary in the motor vehicle. The invention is described by way of example below with reference to the accompanying drawings.

DETAILED DESCRIPTION OF THE DRAWINGS

Figure 1:
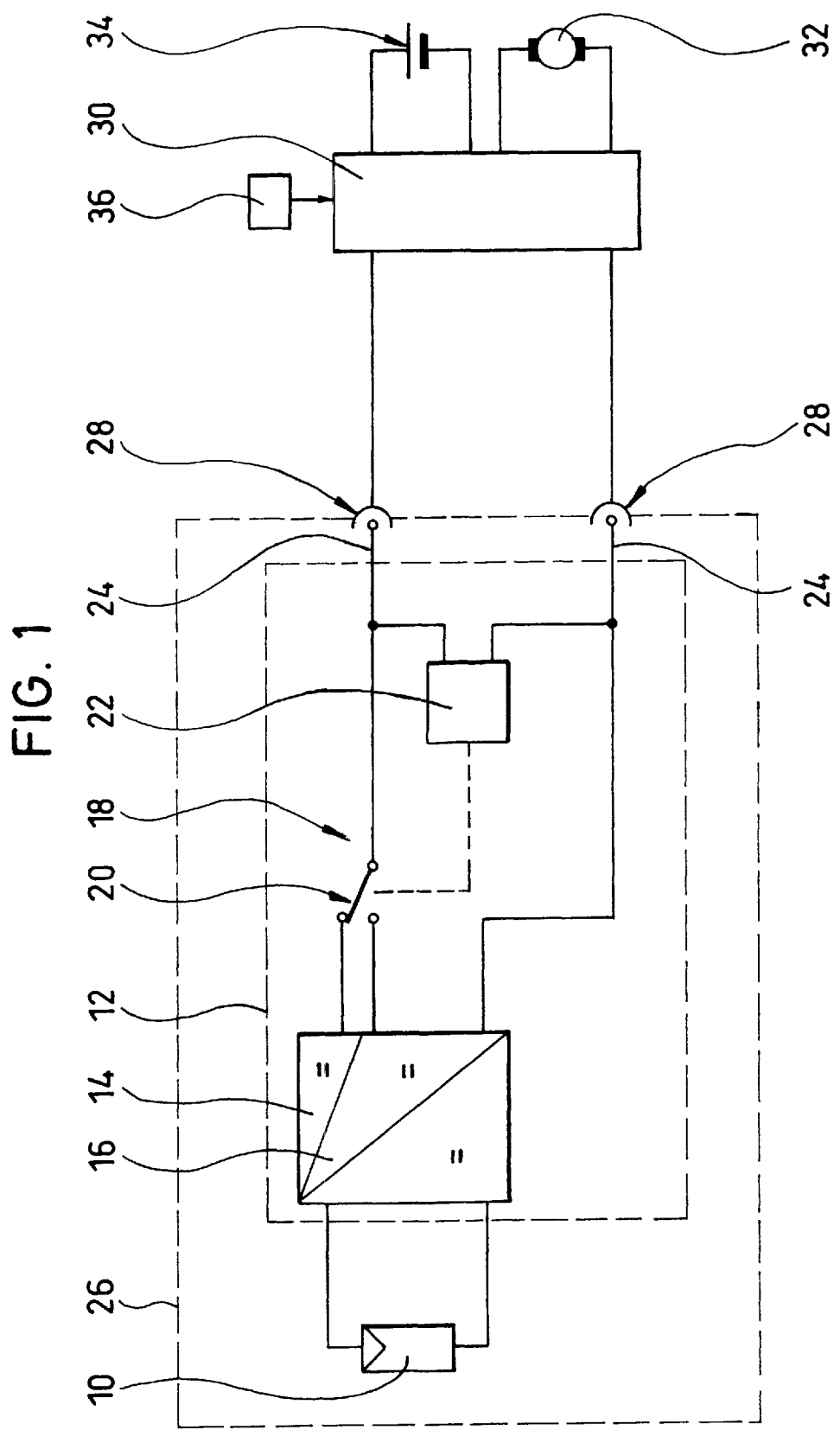
FIG. 1 schematically shows the wiring of a solar system according to a first embodiment of the invention.

FIG. 1 schematically shows the wiring of a solar system for a motor vehicle, the solar generator 10 being connected to a DC/DC converter unit 12 which comprises a step-down converter 14 and a step-up converter 16 and a changeover unit 18. The changeover unit 18 comprises a switch 20 and a comparator unit 22 which acquires the voltage at the output 24 of the converter unit 12 and actuates the switch 20 depending on this acquired voltage. The switch 20 switches the output 24 of the converter unit 12 to the output of the step-down converter 14 or the output of the step-up converter 16.

All the aforementioned components are integrated into the solar cover 26 of a motor vehicle, the two-pole output 24 of the converter unit 12 being in electric contact with the vehicle-mounted electronics described below via so-called solar contacts 28, which electronics comprise a control unit 30 which is formed, for example, by an air conditioning unit, a motor 32 for an interior vehicle fan, the motor vehicle battery 34 and a temperature sensor 36 which measures the temperature in the vehicle interior. The control unit 30 is supplied by the sensor 36 with temperature information and can furthermore acquire the state of the battery 34 by measuring the charging current or the voltage on the battery 34. The control device 30 is made such that the control device 30 sends the solar power produced by the solar generator 10 and delivered via the solar contacts 28, according to set criteria, especially depending on the acquired vehicle interior temperature and the state of the battery 34, to the battery 34 or the fan motor 32. These criteria can be chosen, for example, such that above a certain threshold temperature the fan motor 32 is supplied with solar power when the motor vehicle battery 34 is still in a relatively good state. When the state of the battery is poor, then the generated solar power is routed exclusively to the battery 34.

The operating state of the control unit 30, i.e. depending on whether the battery 34 or the fan motor 32 is connected to the solar contacts 28, determines the voltage which is acquired by the comparator unit 22 and which is at the output 24 of the converter unit 12. Depending on the acquired voltage at the output 24, the comparator unit 22 switches the step-down converter 14 or the step-up converter 16 to the output 24 by actuating the switch 20. The step-down converter 14 is optimized with respect to impedance matching between the solar generator 10 and the fan motor 32 while the step-up converter 16 is optimized with respect to impedance matching between the solar generator 10 and the battery 34. In this way, optimal impedance matching with respect to the solar generator 10 can be achieved both for the battery 34 and also for the fan motor 32. The comparator unit 22 can, for example, be made such that at a voltage of 0 V acquired at the output 24 up to roughly half the vehicle electrical system nominal voltage the comparator unit 22 switches the output 24 to the step-down converter 14, while at a voltage of roughly half the vehicle electrical system nominal voltage acquired at the output 24 the comparator unit 22 switches the output 24 to the step-up converter 16, provisions being made for a certain hysteresis between the two voltage ranges in order to ensure reliable response of the comparator. Thus, in a 12 V vehicle electrical system, for example, the first voltage range can extend from 0 to 6 V and the second voltage range from 8 to 14 C. Values matched accordingly can be chosen for other vehicle electrical systems, for example 24 V or 42 V vehicle electrical systems.

The cover 26 can be, for example, the cover of a sliding roof, sliding and lifting roof, or spoiler roof.

Figure 2:
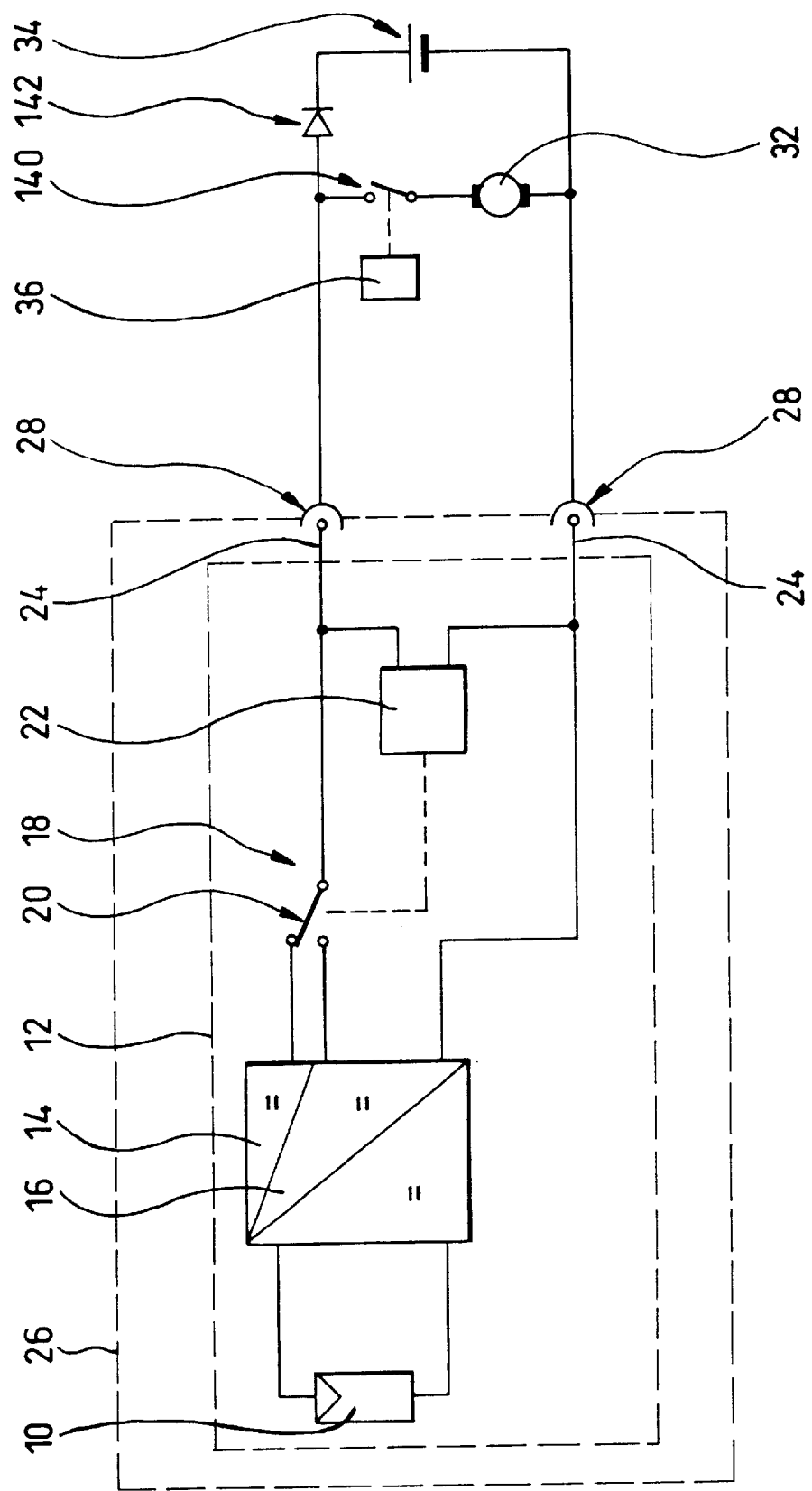
FIG. 2 is a schematic circuit diagram of the solar system according to a second embodiment of the invention.

FIG. 2 shows one version of the embodiment from FIG. 1, the cover-side electronics remaining unchanged, while the vehicle-side electronics is modified essentially by there being no control unit 30, but its switching function is assumed by a switch 140 and a diode 142. The fan motor 32 and the motor vehicle battery 34 in contrast to FIG. 1 are arranged in a parallel connection, the switch 140 being in the path of the fan motor 32 and the diode 142 being in the path of the battery 34. The switch 142 is actuated depending on the temperature in the motor vehicle interior acquired by means of a temperature sensor 36. The diode 142 is a blocking diode which is poled and dimensioned such that discharge of the battery 34 via the fan motor 32 and the solar generator 10 is prevented, the diode 142 being used as a reverse current protection. The diode 142 must be designed only for the charging current. In the embodiment as shown in FIG. 2 the battery 34 is charged in all cases in which the fan motor 32 is not connected to the solar contacts 28, i.e., when the switch 140 is opened. Incorporation of the fan for normal driving operation is not shown here.

Figure 3:
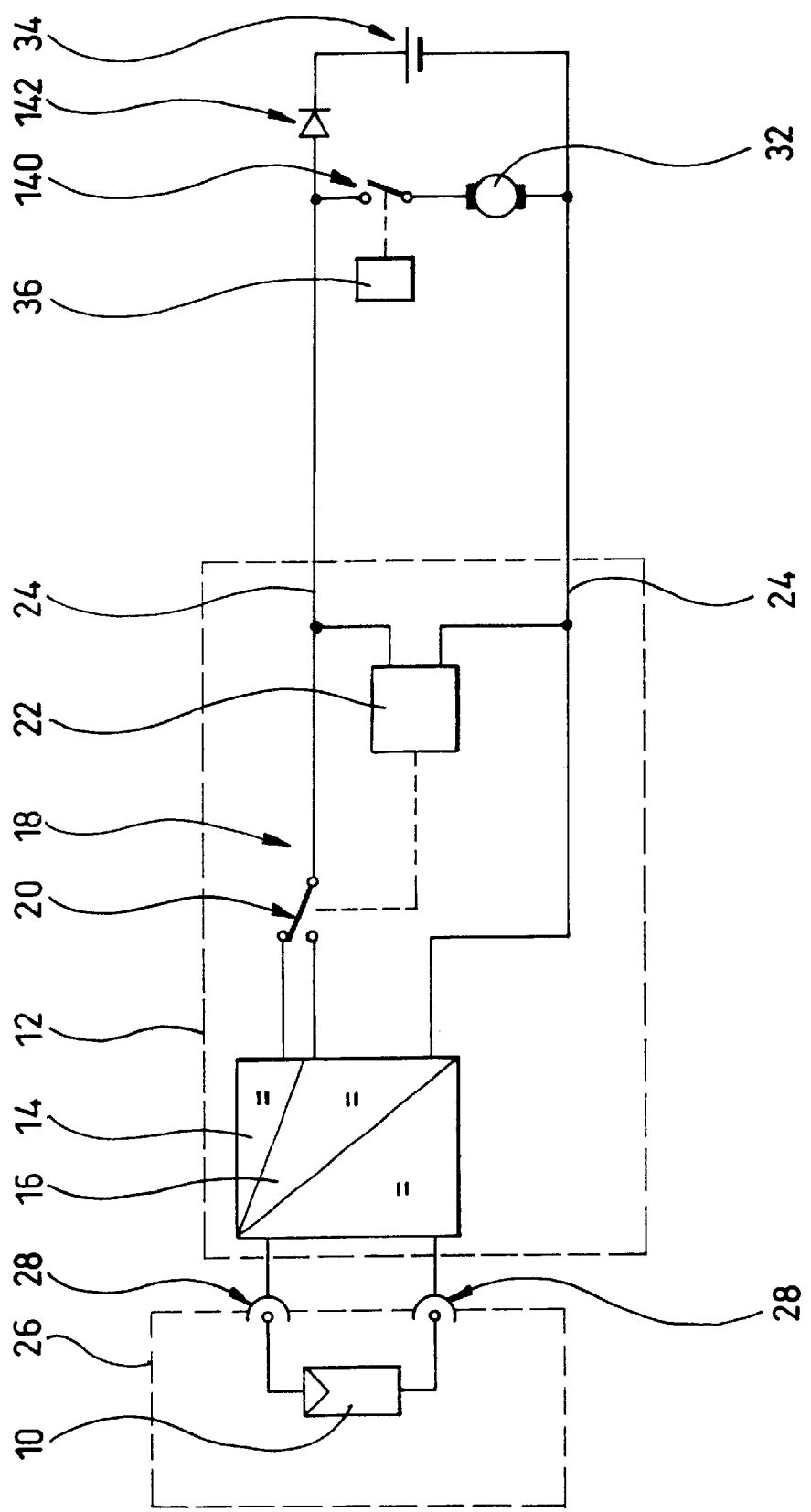
FIG. 3 shows the schematic wiring of a solar system according to a third embodiment of the invention.

FIG. 3 shows a modification of the embodiment shown in FIG. 2, the essential difference arises in that, in contrast to FIG. 2, only the solar generator 10 is integrated into the cover 26, but not the impedance converter unit 12. For this reason, the solar contacts 28 are not at the output 24 of the impedance converter unit 12, but the solar contacts 28 are between the solar generator 10 and the input of the impedance converter unit 12. The embodiment as shown in FIG. 1 with respect to the arrangement of the solar contacts 28 can also be made in the manner of the embodiment from FIG. 3.

What is claimed is:

1. A solar system for a motor vehicle with a motor vehicle roof and a motor vehicle interior, the solar system comprising:
    a solar generator, and
    a DC/DC converter unit,
    wherein the solar system switchably supplies a power consuming device in the motor vehicle and recharges a motor vehicle battery in the motor vehicle,
    wherein the DC/DC converter unit comprises a first and a second DC/DC converter, the first DC/DC converter being optimized with respect to a supply function of the power consuming device and the second DC/DC converter being optimized with respect to a recharging function of the vehicle battery, and
    wherein a changeover unit is connected to an output of the DC/DC converter unit to acquire a voltage therefrom, and wherein the changeover unit is responsive to the acquired voltage for switching between the first and the second DC/DC converters.

2. The solar system as claimed in claim 1, wherein the solar generator, the DC/DC converter unit and the changeover unit are integrated into a solar cover in the motor vehicle roof, and wherein the output of the DC/DC converter unit is routed to two cover-side solar contacts.

3. The solar system as claimed in claim 1, wherein the solar generator is integrated into a solar cover in the motor vehicle roof, and the DC/DC converter unit and the changeover unit are vehicle-mounted off the cover, the output of the solar generator being routed to two cover-side solar contacts.

4. The solar system as claimed in claim 1, wherein the power consuming device is a fan motor.

5. The solar system as claimed in claim 1, wherein the first DC/DC converter is a step-down converter.

6. The solar system as claimed in claim 1, wherein the second DC/DC converter is a step-up converter.

7. The solar system as claimed in claim 1, wherein the changeover unit is adapted to switch the DC/DC converter unit to the first DC/DC converter when the acquired voltage is in a range of 0 V to about half a vehicle electrical system nominal voltage.

8. The solar system as claimed in claim 1, wherein the changeover unit is adapted to switch the DC/DC converter unit to the second DC/DC converter when the acquired voltage is in a range of a voltage of greater than about half a vehicle electrical system nominal voltage acquired up to a maximum allowable voltage.

9. The solar system as claimed in claim 1, wherein the power consuming device is connected in parallel to the motor vehicle battery, and a switch is provided in a path of the power consuming device.

10. The solar system as claimed in claim 9, wherein the switch is actuated depending on the temperature in the motor vehicle interior.

11. The solar system as claimed in claim 9, wherein a blocking diode is provided in the path of the motor vehicle battery, the blocking diode being poled and dimensioned for preventing discharging of the vehicle battery via the power consuming device or the solar generator.

12. The solar system as claimed in claim 1, wherein a control unit is provided, the control unit being operative to distribute solar power, delivered by the DC/DC converter unit according to set criteria, between the motor vehicle battery and the power consuming device.

* * * * *